UNITED STATES PATENT OFFICE.

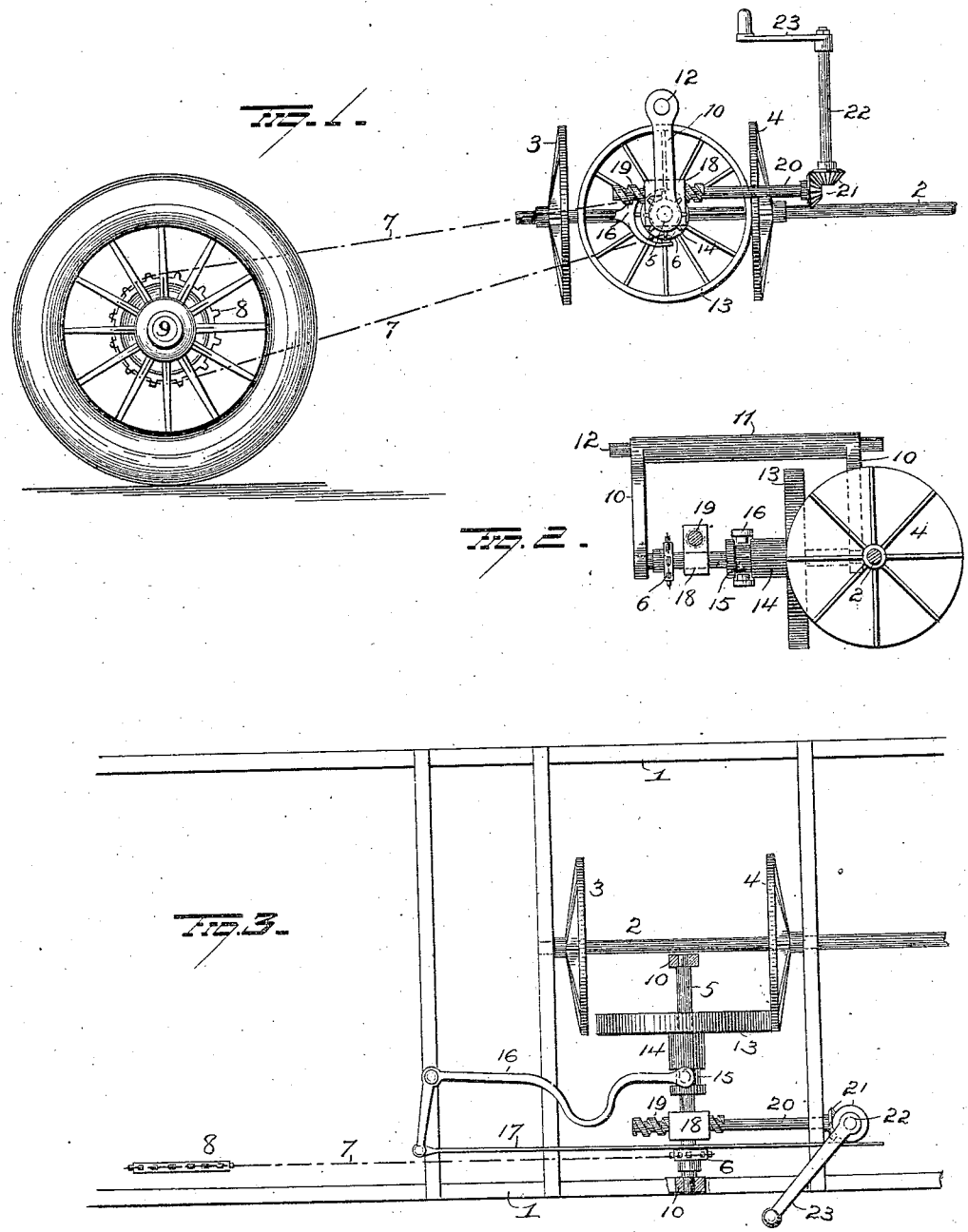

ALVIN O. CARMAN, OF HOMER, MICHIGAN.

FRICTION-GEARING.

No. 855,500.  Specification of Letters Patent.  Patented June 4, 1907.

Application filed July 2, 1906. Serial No. 324,386.

*To all whom it may concern:*

Be it known that I, ALVIN O. CARMAN, a resident of Homer, in the county of Calhoun and State of Michigan, have invented certain new and useful Improvements in Friction-Gearing; and I do hereby declare the following to be a full, clear, and exact description of the invention, such as will enable others skilled in the art to which it appertains to make and use the same.

My invention relates to improvements in friction gearing, the object of the invention being to provide an improved arrangement of friction disks and wheel with improved means for changing the relative position of the wheel to either of the disks to vary the speed and reverse the direction of rotation, all under the complete control of the operator, and the invention consists in certain novel features of construction and combinations and arrangements of parts as will be more fully hereinafter described and pointed out in the claims.

In the accompanying drawings, Figure 1 is a view in side elevation illustrating my improvements. Fig. 2 is a view in cross section, and Fig. 3 is a top plan view.

1 represents the supporting frame, and 2 the drive shaft extending longitudinally of the frame and driven by any desired engine or motor. Two facing drive disks 3 and 4 are secured on shaft 2, spaced apart the desired distance, and provided with friction driving faces.

5 represents the driven shaft, which is located at right angles to drive shaft 2, and extends between the disks 3 and 4, and is provided with a sprocket wheel 6, connected by a drive chain 7, with a sprocket wheel 8 on the driven axle 9 to drive the machine. This driven shaft 5, is supported in bearings at the lower ends of depending arms 10 on a bracket 11 having swinging mounting on a rod 12, as clearly shown in Fig. 2.

A friction wheel 13 is keyed to slide on driven shaft 5, and is made with a peripheral friction surface to engage the faces of either disk 3 or 4, and is made with a hub portion 14, having an annular groove 15 to receive lugs at the end of a forked or bifurcated bell-crank-lever 16, pivotally secured to frame 1, and connected by a rod 17 with a lever or other mechanism to operate the same and slide the wheel 13 on shaft 5, for a purpose which will hereinafter appear.

A block 18 is mounted loosely on shaft 5, and is made with a screwthreaded opening to receive a screw 19 on a horizontal shaft 20, the latter being supported in a bearing in frame 1 and held against longitudinal movement. This shaft 20 is connected by beveled gears 21 with a vertical shaft 22, terminating in proximity to the operators seat, where it is provided with a crank arm 23 to turn the same.

The operation of my improvements is as follows:—Assuming disk 4 to be the forward driving disk and disk 3 to be the reverse, the drawing illustrates the parts in position of forward drive at highest speed. To reverse, the operator turns crank arm 23, which motion is transmitted to shaft 20 and screw 19, and the latter, by reason of its engagement with block 18, will swing bracket 11 to move wheel 13 against disk 3, and the direction of rotation of the wheel 13 will be reversed. By means of the screw, the wheel 13 can be forced against either disk with any degree of pressure desired to insure a perfect frictional engagement, and the wheel 13 can be moved to an intermediate position between the disks to prevent any transmission of power to the driven axle. To decrease the speed, rod 17 is pulled, by means of the operating mechanism, to swing bell-crank-lever 16 and move wheel 13 toward the center of the disks 3 and 4, and as will be readily understood, the nearer the center of the disks the wheel 13 makes contact, the speed will be correspondingly decreased.

My improvements are extremely simple in construction and can be easily and quickly operated, and dispense with a large number of controlling levers, treadles, etc., in common use.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In a power transmitter, the combination with two facing friction disks, of a swinging bracket, a shaft in said bracket, a friction wheel keyed to slide on the shaft between the disks, means for moving the wheel longitudinally of the shaft, a block loose on the shaft, and having a threaded opening, and a screw in said opening adapted to swing the bracket to move the wheel into engagement with either disk or to an intermediate position between them.

2. In a power transmitter, the combination with two facing friction driving disks, of a swinging bracket, a shaft in said bracket, a driven friction wheel keyed to slide on the shaft between the disks, a bell-crank-lever engaging the wheel to move it longitudinally of the shaft, a block on the shaft having a threaded opening, a screw in said opening, a shaft carrying said screw, and a crank arm for turning said last-mentioned shaft to move the wheel into engagement with either disk or to an idle position between them.

In testimony whereof, I have signed this specification in the presence of two subscribing witnesses.

ALVIN O. CARMAN.

Witnesses:
WM. J. WEBSTER,
ALBERT ANDRUS.